United States Patent Office 3,068,603
Patented Dec. 18, 1962

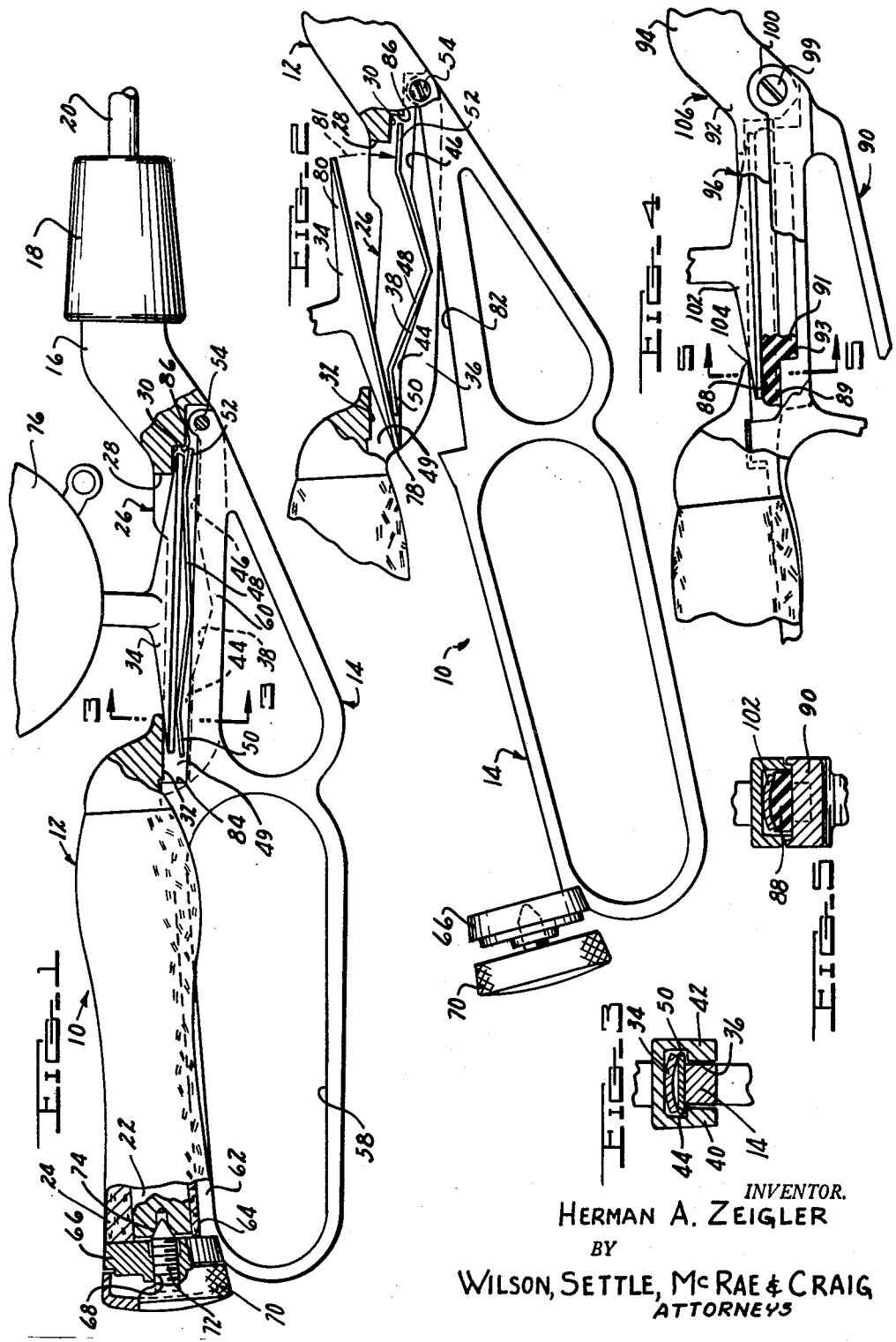

3,068,603
FISHING ROD HANDLE WITH REEL
LOCKING DEVICE
Herman A. Zeigler, 22601 Beech St., Dearborn 8, Mich.
Filed Oct. 10, 1960, Ser. No. 61,558
6 Claims. (Cl. 43—22)

This invention relates to fishing rod handles and more particularly, to a handle adapted to grip and hold a reel, such as a casting reel or a spin cast or trolling reel, in an improved manner.

Fishing reels are customarily provided with a relatively thin rectangular-shaped base adapted to be secured to a depressed portion of a handle in order to position the reel in such a manner that the fisherman can place his thumb on the reel to provide a controlled drag thereon. The fisherman is thus able to control the rotation of the reel and the flow of the line from the reel to prevent the line from becoming doubled back upon itself to cause a back-lash resulting in the tangling of the line.

In securing such reels to rod handles, it has been common practice to project one end of the rectangular shaped base into an undercut portion formed in the base of the handle and to push a ferrule over the other end of the base of the reel to fasten it to the handle.

This type of fastener has not proven to be fully satisfactory because it does not hold the reel with a sufficient degree of secureness. This type of fastener is difficult to use and does not hold the reel from shifting sidewise slightly, particularly while the fisherman is attempting to land a heavy fish.

An object of my invention is to provide an improved fishing rod handle having a novel reel clamping mechanism whereby the reel can be securely clamped to the rod-carrying handle in such a manner as to prevent the reel from shifting on the handle, particularly when subjected to heavy stresses.

A further object of my invention resides in the provision of an improved attaching mechanism for securing a reel to a handle in such a manner that a single handle may readily receive reels having bases of different sizes.

Another object of my invention is to provide a novel reel attaching mechanism which can be easily operated and which does not require any particular skill to use whereby an angler can quickly assemble his rod and reel and be ready for fishing with the minimum delay.

Still a further object of my invention is to provide an improved attaching mechanism for securing a reel to a rod handle wherein the rod handle is provided in two parts pivotally attached together whereby the parts may be pivoted apart for the insertion of a reel base into the handle and may be subsequently clamped together to hold the reel securely in place.

Yet another object of my invention is to provide an improved fishing rod handle which can be economically manufactured and which inherently possesses strong sales appeal for attracting a fisherman's interest in its ability to hold the reel in assembled relation with the rod and handle in an interesting and improved manner.

Other objects of this invention will appear in the following description and appended claims, reference being had to the accompanying drawings forming a part of this specification wherein like reference characters designate corresponding parts in the several views.

In the drawings:

FIGURE 1 is a side elevational view of one embodiment of my improved fishing rod handle with parts broken away for the purpose of clarity;

FIGURE 2 is a partial side elevational view of the FIGURE 1 embodiment showing the handle members pivoted to permit the insertion of a reel base therein;

FIGURE 3 is a sectional view taken substantially along the line 3—3 of FIGURE 1 looking in the direction of the arrows showing one end of a reel base clamped in position;

FIGURE 4 is a partial side elevational view of a second embodiment of my invention with parts broken away for the purpose of clarity; and FIGURE 5 is a cross-sectional view taken substantially along the line 5—5 of FIGURE 4 looking in the direction of the arrows illustrating the clamping of one end of a reel base in the handle.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phaseology or terminology employed herein is for the purpose of description and not of limitation.

Referring to FIGURES 1 and 2, it may be seen that the fishing rod handle 10 includes an elongated member 12 to which is pivotally attached an elongated lever 14. The member 12 has a forwardly projecting finger 16 which has the usual threaded ferrule 18 for clamping a rod 20 to the handle. The member 12 also has a rearwardly projecting finger 22 which receives a hollow hand grip member 24, preferably fabricated of cork or similar material.

Interposed between the fingers 16, 22 is a depressed reel supporting section 26. The reel supporting section 26 has an elongated longitudinally extending opening 28 through which the base of the reel is inserted when being mounted in the handle. A portion of the section 26 is undercut beneath each end of the opening 28 to form surfaces 30, 32 which abut against reel base 34 of reel 76 after the reel base has been inserted into the handle. A longitudinally extending slot 36 is provided in the underside of the section 26 extending from a point forwardly of the opening 28 to approximately the juncture of the rearwardly extending finger 22 and depressed section 26. The slot 36 is narrower than the opening 28 and receives the lever 14 when the handle is clamped together in reel engaging position.

An inwardly extending V-shaped shoulder 38 is provided on each side wall 40, 42 of the slot 36. The V-shaped shoulder 38 terminates in horizontally extending shoulder portions 44, 46. The shoulder portion 44 extends to the rearward end of the depressed portion 26 and an opening 49 is formed thereabove to permit the insertion of the end of a reel base during mounting of the reel on the handle (as will be subsequently explained). A V-shaped spring 48 is seated on the shoulder 38. The spring 48 has horizontally extending end portions 50, 52 which seat on the portions 44, 46. The function of the spring 48 is to provide a resilient seat for a reel base.

The lever 14 is pivotally secured in the forward end of slot 36 by means of a screw 54. The lever has a small finger opening 56 and a larger finger opening 58 whereby the handle may be gripped with the index finger inserted into finger opening 56 and the remaining three fingers extended through the opening 58. The forward portion 60 of the lever is received in the slot 36 while the rearward portion 62 is received in a slot 64 provided in the hand grip member 24. Secured to the rearward end of the lever is a nut 66 having a threaded opening 68. A cap 70 having a threaded stud 72 is provided with the stud 72 threadingly received in the opening 68. The first thread on the stud 72 may be battered or staked to prevent removal of the cap from the nut 66. When the handle is assembled in reel engaging position, the inner end of the stud 72 is received in a conical recess 74 provided on the rearward end of the finger 22. This arrangement locks the member 12 and lever 14 together.

In operation, the reel 76 having base 34 is positioned in the handle with the handle member and lever pivoted apart as shown in FIGURE 2. The rearward end 78 of the base 34 is first inserted through the opening 28 and thence through the opening 49. The forward end 80 is then pivoted downwardly as shown by dotted line 81 to clear the front end of the opening 28 and the reel is shifted forwardly so that each end 78, 80 of the base extends beneath a surface 30, 32. With the reel in this position, the lever 14 is pivoted towards the member 12 and the cap 70 is turned to thread the stud into engagement with the recess 70. When the lever is pivoted upwardly, the surface 82 will abut against the V-shaped spring 48 causing this spring to deform as shown in FIGURE 1 to provide a resilient seat for the reel base.

The reel base cannot escape from the handle when it is secured in position as illustrated in FIGURE 1. As will be noted, a stop member 84 is provided on lever 14 to be adjacent the rearward end of the depressed section 26 when the lever is in clamping position. A cooperating stop surface 86 is formed at the termination of the surface 30. The geometry of the clamping mechanism is designed so that regardless of whether the reel is shifted forwardly or rearwardly in use, the ends 78, 80 of the base will not clear the opening 28. The distance from the forward end of the opening 28 to the stop member 84 is less than the length of the reel base, the distance from the rear end of the opening 28 to the stop surface 86 is less than the length of the reel base, and, it follows, the opening 28 is shorter than the reel base.

A second embodiment of the invention is illustrated in FIGURES 4 and 5. The handle 106 is the same as the FIGURE 1 embodiment excepting for the configuration of the reel base locking portion. As shown in FIGURE 4, the V-shaped spring is replaced by a resilient pressure pad 88 which may be fabricated from rubber or like material. The pad 88 seats on surface 89 of the lever 90 and has a portion 91 which is received in recess 93 of the lever. The lever 90 is pivotally attached to the handle member 92 at a point adjacent to the juncture of the forwardly projecting finger 94 and the depressed reel engaging section 96 by means of a screw 99 which extends through ears 100 which extend on either side of the depressed section 96. The reel base 102 is inserted through opening 104 with the lever and handle member 92 separated as in the FIGURE 2 showing. When the lever is placed in position, the reel base abuts against the pressure pad 88 and is locked in the handle as in the FIGURE 1 showing.

Having thus described my invention, I claim:

1. A fishing rod handle comprising a handle member having an elongated opening therethrough for the insertion of a reel base therethrough; said opening being shorter than the length of the reel base; a lever pivotally attached to the handle member; said lever having a surface pivotable to a position for engagement with the underside of a reel base to clamp a reel base between the handle member and the lever; and means to lock the handle member and lever together to releasably clamp a reel base in the handle.

2. In a fishing rod handle, a handle member having an elongated opening therethrough for the insertion of a reel base therethrough; said opening being shorter than the length of the reel base; a lever pivotally attached to the handle member; said lever having a clamping surface pivotable to a position in alignment with the handle member opening to engage the underside of a reel base to clamp a reel base between the handle member and said clamping surface; a pair of stop surfaces in the handle positioned adjacent each end of a clamped reel base to limit longitudinal shifting of the base to prevent escape of the base from the handle after the base has been clamped therein; and means to releasably lock the handle member and lever in reel engaging position.

3. A device as claimed in claim 2 and further characterized in the provision of a resilient seat member for a reel base; said resilient seat being positioned in the handle member and spaced from the handle member opening.

4. A device as claimed in claim 3 and further characterized in that the resilient seat member is positioned on the clamping surface of the lever.

5. A handle for a fishing reel comprising first and second elongated members pivotally attached together at one end; an opening through the first member of a size sufficient to permit the insertion of a reel base therethrough when the second member is pivoted away from the first member; said second member being thereafter pivotable to engage the underside of the reel base and clamp the reel base in position; and locking means to secure the first and second members together; said locking means comprising a nut carried on the non-attached end of the second member; a threaded member engaging the nut; there being a recess in one end of the first member; said threaded member being in registry with said recess when the first and second members are pivoted together whereby the threaded member is threadable into engagement with the recess to lock the first and second members together.

6. In a fishing rod handle, a handle member having a forwardly projecting finger for engaging a rod; a rearwardly projecting hand-grip finger on the handle member; a depressed portion between said fingers; said depressed portion having an opening therethrough for the insertion of a reel base therethrough; said opening being shorter than the length of the reel base; a lever pivotally attached to the handle member; said lever having a clamping surface pivotable to a position in alignment with the handle member opening to clamp a reel base between the depressed portion and said clamping surface; a first stop surface on said depressed portion adjacent one end of a clamped reel base; a second stop surface on the lever adjacent the other end of a clamped reel base; said first and second stop surfaces acting to limit longitudinal shifting of the base to prevent escape of the reel base from the handle after the base has been clamped therein; and means to releasably lock the handle member and lever in reel engaging position.

References Cited in the file of this patent

UNITED STATES PATENTS

| 258,902 | Eggleston | June 6, 1882 |
| 265,049 | Finney | Sept. 26, 1882 |
| 1,923,035 | Hoerle et al. | Aug. 15, 1933 |
| 2,114,107 | Holding | Apr. 12, 1938 |
| 2,456,681 | Culver | Dec. 21, 1948 |
| 2,814,147 | Henshaw | Nov. 26, 1957 |

FOREIGN PATENTS

| 463,767 | Canada | Mar. 21, 1950 |
| 20,533 | Norway | Sept. 12, 1910 |